(12) United States Patent
Sustic et al.

(10) Patent No.: US 10,266,731 B2
(45) Date of Patent: Apr. 23, 2019

(54) AMORPHOUS HEXENE-1 BASED POLYMERIC HOT MELT ADHESIVE

(71) Applicants: Andres Sustic, Odessa, TX (US); Nick Fowler, Odessa, TX (US); John Passmore, Odessa, TX (US)

(72) Inventors: Andres Sustic, Odessa, TX (US); Nick Fowler, Odessa, TX (US); John Passmore, Odessa, TX (US)

(*) Notice: Subject to any disclaimer, the term of this patent is extended or adjusted under 35 U.S.C. 154(b) by 0 days.

(21) Appl. No.: 16/111,494

(22) Filed: Aug. 24, 2018

(65) Prior Publication Data
US 2019/0002742 A1   Jan. 3, 2019

Related U.S. Application Data

(63) Continuation of application No. 15/486,115, filed on Apr. 12, 2017.

(60) Provisional application No. 62/558,670, filed on Sep. 14, 2017, provisional application No. 62/321,663, filed on Apr. 12, 2016.

(51) Int. Cl.
C09J 123/14 (2006.01)
C08J 3/00 (2006.01)

(52) U.S. Cl.
CPC .............. C09J 123/14 (2013.01); C08J 3/00 (2013.01)

(58) Field of Classification Search
CPC .................................................... C09J 123/14
See application file for complete search history.

(56) References Cited

U.S. PATENT DOCUMENTS

| | | | |
|---|---|---|---|
| 3,954,697 A | 5/1976 | McConnell et al. | |
| 4,072,813 A | 2/1978 | McConnell et al. | |
| 4,169,116 A | 9/1979 | Trotter et al. | |
| 4,210,570 A | 7/1980 | Trotter et al. | |
| 4,259,470 A | 3/1981 | Trotter et al. | |
| 4,264,756 A | 4/1981 | Trotter et al. | |
| 4,288,358 A | 9/1981 | Trotter et al. | |
| 4,309,522 A | 1/1982 | Dietrich et al. | |
| 4,322,514 A | 3/1982 | Miyoshi et al. | |
| 4,415,718 A | 11/1983 | Miyoshi et al. | |
| 4,826,939 A | 5/1989 | Stuart, Jr. | |
| 4,847,340 A | 7/1989 | Allen et al. | |
| 4,886,853 A * | 12/1989 | Foster .................. A61L 15/585 524/477 |
| 5,262,216 A | 11/1993 | Popat et al. | |
| 5,274,037 A | 12/1993 | Miller | |
| 5,302,675 A | 4/1994 | Sustic et al. | |
| 5,637,665 A | 6/1997 | Sustic et al. | |
| 5,681,913 A | 10/1997 | Sustic et al. | |
| 5,714,554 A | 2/1998 | Sustic et al. | |
| 5,763,547 A | 6/1998 | Kolthammer | |
| 6,586,536 B1 | 7/2003 | Kelley | |
| 6,586,543 B1 | 7/2003 | Wey et al. | |
| 6,653,385 B2 | 11/2003 | Wang et al. | |
| 6,872,279 B1 | 3/2005 | Kolowrot et al. | |
| 7,517,579 B2 | 4/2009 | Campbell et al. | |
| 8,551,270 B2 | 10/2013 | Previty et al. | |
| 2010/0059178 A1 | 3/2010 | Jiang et al. | |
| 2012/0302716 A1 | 11/2012 | Kobayashi et al. | |
| 2014/0079919 A1 | 3/2014 | Bunnelle | |
| 2015/0148473 A1 | 5/2015 | Sustic et al. | |
| 2017/0088754 A1 * | 3/2017 | Sustic .................... C09J 123/14 |

FOREIGN PATENT DOCUMENTS

EP       0211311 A2    2/1987

* cited by examiner

*Primary Examiner* — Robert D. Harlan
(74) *Attorney, Agent, or Firm* — Buskop Law Group, P.C.; Wendy Buskop

(57) ABSTRACT

A hot melt adhesive formulation includes 60 to 99 wt. % of an amorphous propylene-co-hexene-1 polymer component based on the total weight of the hot melt adhesive without the use of flammable solvents, 20 to 80 wt % of hexene-1 co-monomer based on the total weight of the amorphous propylene-co-hexene-1 copolymer component, 20 to 80 wt. % of a propylene co-monomer based on the total weight of the amorphous propylene-co-hexene-1 copolymer component, and from 1 to 40 wt. % of a co-adjuvant based on the total weight of the hot melt adhesive. The hot melt adhesive formulation has rolling ball tack from 2 to 50 centimeters at ambient temperature after conditioning at ambient temperatures for 24 hours. The hexene-1 monomer to propylene monomer ratios are from 4:1 to 1:4.

14 Claims, 1 Drawing Sheet

| | HMA Formulation composition | | | | | |
|---|---|---|---|---|---|---|
| Example # | C3=/C6= Copolymer | C3=/C4=/C6= Terpolymer | Co-adjuvant | PES donor | RBT, cm | H/P, min. |
| 1 | 60% of (50% C3=/50% C6=) | N/A | 40% of Eastotac H100W | N/A | 25 | --- |
| 2 | 90% of (60% C3=/40% C6=) | N/A | 10% of Hydrobrite 1000 | N/A | 10 | --- |
| 3 | 95% of (70% C3=/30% C6=) | N/A | 5% of Escorez 5400 | N/A | 47 | --- |
| 4 | 100% of (50% C3=/50% C6=) | N/A | None | N/A | 5 | --- |
| 5 | 92% of (20% C3=/80% C6=) | N/A | 8% of silanated APAO | N/A | 13 | --- |
| 6 | 70% of (50% C3=/50% C6=) | N/A | 30% functionalized ABH | N/A | 2 | --- |
| 7 | N/A | 90% (30% C3=/20% C4=/50% C6) | 10% Escorez 5400 | N/A | 10 | 120 |
| 8 | N/A | 95% (30% C3=/40% C4=/30% C6=) | 1% Hydrobrite 1000 | N/A | 20 | 50 |
| 9 | 90% of (40% C3=/60% C6=) made using PES donor | N/A | 10% maleated polyethylene | Yes | 25 | --- |
| 10 | N/A | 60% (60% C3=/20% C4=/20% C6=) made using PES donor | 40% maleated polyethylene wax | Yes | 50 | 1440 |
| 11 | 80% of (60% C3=/40% C6=) | N/A | 20% RT 2730 APAO | N/A | 10 | --- |
| 12 | 88% of (40% C3=/60% C6=) | N/A | 12 wt% Kraton MD-1648 | N/A | 15 | --- |
| 13 | N/A | 75% (20% C3=/40% C4=/40% C6=) | 25% maleated polypropylene wax | N/A | 40 | 400 |
| 14 | N/A | 80% (30% C3=/50% C4=/10% C6=) | 20% of PE & PP waxes | N/A | 40 | 600 |

NOTES: C3= represents propylene, C4=, butene-1 and C6=, hexene-1. N/A means Not Applicable. H/P is Holding Power while RBT is rolling ball tack.

AMORPHOUS HEXENE-1 BASED POLYMERIC HOT MELT ADHESIVE

The present application claims priority to U.S. Provisional Application No. 62/558,670 filed Sep. 14, 2017, for "Amorphous Hexene Polymer Hot Melt Adhesive"; and is a continuation of U.S. patent Ser. No. 15/486,115 filed Apr. 12, 2017, for "Hexene-1 Containing Amorphous Polyalphaolefins for Improved Hot Melt Adhesives", which claims priority to U.S. Provisional Patent Application Ser. No. 62/321,663, filed on Apr. 12, 2016 for "Hexene-1 Containing Amorphous Polyalphaolefins for Improved Hot Melt Adhesives". These references are hereby incorporated in their entirety.

FIELD

The present invention relates to general purpose hot melt adhesive formulations for the permanent or temporary joining of two or more similar or dissimilar materials.

BACKGROUND

Hot melt adhesives (HMAs) are a form of thermoplastic adhesive that are designed to be applied in the molten state. The glue is tacky when hot, and solidifies from a few seconds to several minutes. Hot melt adhesives may be applied by such methods as slot-coating, roll-coating, extrusion, dipping or spraying.

In industrial use, hot melt adhesives provide several advantages over solvent-based adhesives. Volatile organic compounds are reduced or eliminated, and the drying or curing step is eliminated. Hot melt adhesives have long shelf life and usually may be disposed of without special precautions. Some of the disadvantages involve thermal load of the substrate, limiting use to substrates sensitive to higher temperatures, and loss of bond strength at higher temperatures, due to significant, and up to complete melting of the adhesive. Some HMAs may not be resistant to chemical attacks and weathering. HMAs do not lose thickness during solidifying; solvent-based adhesives may lose from up to 50%-70% of layer thickness during drying.

Hot melt adhesives formulations of the prior art include styrene block copolymer (SBC, aka rubber)-based formulations, acrylic-based (acrylics) formulations, silicone-based formulations, and metallocene polyethylene- and metallocene polypropylene-based formulations.

Amorphous poly alpha olefin (APAO) polymers are compatible with many plasticizers, tackifiers, waxes, and polymers; they find wide use in many adhesive applications. APAO hot melt adhesives have good acid resistance, moderate heat resistance, light and UV resistance due to their saturated hydrocarbon nature, are tacky, soft and flexible, have good adhesion to multiple substrates and longer open times than crystalline polyolefins. APAOs tend to have lower melt viscosity, better adhesion, longer open times and slower set times than comparable ethylene vinyl acetate (EVA) copolymers. Some APAOs may be used alone, but often they are compounded with co-adjuvants such as tackifiers, waxes, and plasticizers (for example, mineral oil, polybutylene oil and naphthenic oil).

Amorphous poly alpha olefins are produced by the (co-) polymerization of α-olefins, for example, ethylene (CAS# 74-85-1), propylene (CAS# 115-07-1), butene-1 (CAS# 106-98-9) or hexene-1 (CAS# 592-41-6), with Ziegler-Matta catalysts. The (co-)polymers have an amorphous structure which makes them useful for the production of hot melt adhesives.

Examples of amorphous poly alpha olefins include for example, amorphous (also known as atactic) polypropylene (APP, CAS# 9003-07-0), amorphous poly propylene-co-ethylene (APE, CAS# 9010-79-1), amorphous poly propylene-co-butene-1 (APB, CAS# 29160-13-2), amorphous poly propylene-co-hexene-1 (APH, CAS# 25895-44-7) copolymers, and amorphous poly propylene-co-ethylene-co-butene-1 (APEB, CAS# 25895-47-0) and amorphous poly propylene-co-butene-1-co-hexene-1 (APBH) terpolymers. APP is harder than APE, which is generally harder than APB, which is generally harder than APH, in accordance with decreasing crystallinity. And in accordance to their decreasing crystallinity, APP has higher tensile or mechanical strength than APE, which has generally higher tensile or mechanical strength than APB, which has generally higher tensile or mechanical strength than APH. Due to their lower molecular weights than other polymers such as styrene block copolymers (SBCs), or acrylics or many metallocene polyethylenes and polypropylenes, at typical application temperatures of 375 degrees Fahrenheit, APAOs exhibit a high degree of substrate wetting which is a very desirable HMA property. However, APAOs show relatively low cohesion, the entangled polymer chains having a fairly high degree of freedom of movement. Under mechanical load, most of the strain is dissipated by elongation and disentanglement of polymer chains, and only a small fraction reaches the adhesive-substrate interface. Cohesive failure rather than adhesive failure is therefore a more common failure mode of APAOs.

The present embodiments meet these needs.

BRIEF DESCRIPTION OF THE DRAWINGS

The detailed description will be better understood in conjunction with the accompanying drawings as follows:

FIG. 1 depicts a table of examples 1 through 14 according to one or more embodiments.

The present embodiments are detailed below with reference to the listed Figures.

DETAILED DESCRIPTION OF THE EMBODIMENTS

Before explaining the present formulation in detail, it is to be understood that the formulation is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The following description of the embodiments is merely exemplary in nature and is in no way intended to limit the subject matter of the present disclosure, its application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The term "amorphous propylene-co-hexene-1 polymer component" can include long chains of propylene and hexene-1 monomers assembled together in a random order which inhibits the formation of crystalline structures or crystalline order.

The term "co-adjuvant" can refer to additives such as hydrogenated C5 tackifiers or plasticizers such as naphthenic oils The term "hot melt adhesive formulation" can refer to a thermoplastic material that is blended, or formulated, with other materials to make a formulation with a broader use of application spectrum.

The term "hexene-1 co-monomer" refers to one of eighteen hexene isomers in which the double bond is in the primary alpha carbon atom.

The term "butene-1 co-monomer" refers to one of four butene isomers in which the double bond is in the primary alpha carbon atom.

The term "propylene co-monomer" refers to an ethylene molecule with one methyl group in any one of the two unsaturated carbon atoms in ethylene. This would make propylene the simplest alpha olefin molecule.

A hot melt adhesive formulation comprises 60 wt. % to 99 wt. % of an amorphous propylene-co-hexene-1 polymer component based on the total weight of the hot melt adhesive without the use of flammable solvents; comprising: 20 wt. % to 80 wt. % of hexene-1 co-monomer based on the total weight of the amorphous propylene-co-hexene-1 polymer component, 20 wt. % to 80 wt. % of a propylene co-monomer based on the total weight of the amorphous propylene-co-hexene-1 polymer component; and wherein the hexene-1 co-monomer to propylene co-monomer ratio is from 4:1 to 1:4, and 1 wt. % to 40 wt. % of a co-adjuvant based on the total weight of the hot melt adhesive.

The hot melt adhesive formulation has a rolling ball tack from 2 to 50 centimeters at ambient temperature after conditioning at ambient temperatures for 24 hours without the use of flammable solvents.

The hot melt adhesive comprises in the amorphous propylene-co-hexene-1 polymer component from 20 wt % to 80 wt. % of a 1-butene co-monomer forming a terpolymer of the amorphous hexene-1 polymer component.

The hexene-1 co-monomer to propylene co-monomer to butene-1 co-monomer is at a ratio of 1:3:1 to 8:1:1 and the hot melt adhesive formulation has a rolling ball tack from 2 centimeters to 50 centimeters at ambient temperature after conditioning at ambient temperatures for 24 hours and the hot melt adhesive formulation has a holding power of from 5 minutes to 1440 minutes according to a Pressure Sensitive Tape Council (PSTC) test method 107, effective July 2018.

The adhesive formulation comprises an externally added electron donor consisting of an alkoxy silane component of the formula RnSi-(OR')4-n where n=1-3, R=aryl or alkyl and R'=C1-3 alkyl in a sufficient quantity such that the molar ratio of organo-aluminum co-catalyst to alkoxy silane is in the range from 10:1 to 500:1.

The adhesive formulation comprises an externally added electron donor consisting of an alkoxy silane component of the formula RnSi-(OR')4-n where n=1-3, R=aryl or alkyl and R'=C1-3 alkyl in a sufficient quantity such that the molar ratio of organo-aluminum co-catalyst to alkoxy silane is in the range from 10:1 to 500:1.

The co-adjuvants are selected from the group consisting of plasticizers, tackifiers, polyethylene waxes, polypropylene waxes, low molecular weight metallocene-made polyethylenes, low molecular weight metallocene-made polypropylenes, low molecular weight maleated polypropylene, low molecular weight maleated polyethylene, low molecular weight maleated polyethylene wax, maleated polypropylene waxes, styrene block co-polymers, ethylene vinyl acetate amorphous poly alpha olefins (APAO), functionalized hexene-1 based copolymers and terpolymers, and silanated amorphous poly alpha olefins (APAO) for moisture-activated crosslinking.

An article comprises a permanent or temporary connection of two similar structural materials with the hot melt adhesive formulation.

An article comprises a permanent or temporary connection of two dissimilar structural materials with the hot melt adhesive formulation.

An article comprises a permanent or temporary connection of a film to a metal substrate with the hot melt adhesive formulation.

An article comprises a permanent or temporary connection of a first metal substrate to a second metal substrate with the hot melt adhesive formulation.

An article comprises a permanent lamination of two similar films with the hot melt adhesive formulation.

An article comprises a temporary lamination of two dissimilar films with the hot melt adhesive formulation.

An article of clothing is constructed with the hot melt adhesive formulation.

An article of personal hygiene such as an infant or child care diaper or an adult incontinence diaper or a feminine hygiene article is constructed with the hot melt adhesive formulation.

A label is constructed with the hot melt adhesive formulation.

A sealing tape is formed using the hot melt adhesive formulation.

The present disclosure is directed to a general purpose hot melt adhesive for the permanent or temporary joining, adhering, coupling, sealing, or laminating of two or more similar or dissimilar materials. In some instances, adhesive formulations according to the present disclosure comprise one or more of neat (that is, pure or substantially pure) homopolymers, copolymers and/or terpolymers of an amorphous hexene-1 polyolefin. In other instances, adhesive formulations according to the present disclosure comprise a blend of one or more homopolymers, copolymers and/or terpolymers of an amorphous hexene-1-containing polyolefin and one or more homo-, co- and/or terpolymers of a non hexene-1 containing amorphous polymer. In some instances, hot melt adhesive formulations according to the present disclosure comprise (i) about 0.1 to about 100 weight percent of a hexene-1 containing amorphous poly alpha olefin co-polymer or terpolymer formulation comprising monomer units derived from hexene-1 and from about 10 to about 90 weight percent of propylene monomer units; and (ii) from about 0.1 to about 99.9 weight percent of an amorphous polypropylene homopolymer, copolymer or terpolymer formulation comprising of propylene monomer units and co-monomer units selected from the group consisting of ethylene, 1-butene, and 1-octene.

A benefit of this invention is that the hot melt adhesive is made without solvents, preventing explosions due to solvents, which makes a work environment safer for workers.

A benefit of this invention is the temperature range needed to formulate this hot melt adhesive. A low temperature range of from 275 degrees to 375 degrees Fahrenheit is used to create this hot melt adhesive which saves on the need for fossil fuels by a facility.

A benefit of this invention is that the lower temperature range for the polymerization of this amorphous hexene-1-containing polyolefin prevents harm to humans in the facility, which might otherwise be fatal, such as third degree burns.

The absence of solvents in the hot melt formulation avoids exposing wildlife to excursions of solvent vapors from the manufacturing plant, keeping the animals around the plant safer; enabling grazing of domestic livestock near the plant that otherwise might be harmful.

In some instances, hot melt adhesive formulations according to the present disclosure comprise (i) 0.1 to about 100 weight percent of an amorphous hexene-1 polyolefin homopolymer or copolymer formulation comprising monomer units derived from hexene-1 and from about 0.1 to about 100 weight percent of propylene monomer units; and (ii) from about 0.1 to about 99.9 weight percent of an amorphous propylene homopolymer, copolymer or terpolymer formulation comprising of propylene monomer units and one, two or three co-monomer units selected from the group consisting of ethylene, 1-butene, and 1-octene.

In some instances, hot melt adhesive formulations according to the present disclosure can further include one or more of a tackifier, an oil, a wax, a functionalized or non-functionalized polymer, an anti-oxidant, and a mineral. In some instances, hot melt adhesive formulations according to the present disclosure can comprise about 1 to about 90 weight percent of a combination of one or more of the co-adjuvants, wherein the co-adjuvant is selected from the group of plasticizers, tackifiers, polyethylene waxes, polypropylene waxes, maleated polypropylene, maleated polyethylene, maleated polyethylene waxes, maleated polypropylene waxes and compatible polyethylenes, polypropylenes, metallocene polyethylenes, metallocene polypropylenes, styrene block co-polymers, ethylene vinyl acetate and polyolefin copolymers.

Amorphous hexene-1 containing poly alpha olefins and/or non-hexene-1 containing amorphous polypropylenes, can be produced in a continuously stirred tank reactor (CSTR) at an extended temperature range using a primary reaction catalyst. In some instances, the primary reaction catalyst can be a transition metal Ziegler-Natta catalyst. In yet other instances, the primary reaction catalyst can be a metallocene-based catalyst. In yet other instances, the primary reaction catalyst can be a late transition metal supported catalyst, known in the art as a Ziegler-Matta catalyst. In some instances, the amorphous hexene-1 containing poly alpha olefins and/or the non-hexene-1 containing amorphous polypropylenes can be produced in the reactor vessel from a liquid pool of monomers. In other instances, the amorphous hexene-1 containing polyolefins and/or the non-hexene-1 containing amorphous polypropylenes can be produced in the reactor vessel from a liquid pool of monomers and non-reactive alkanes such as, for example, hexane, octane, decane and dodecane.

Amorphous hexene-1 containing polyolefins and/or non-hexene-1 containing amorphous polymers, can be produced in a CSTR at an extended temperature range using a Ziegler-Natta catalyst, and a co-catalyst. In some instances, the co-catalyst can be an organo-aluminum compound such as for example, trimethylaluminum (TMA, CAS# 75-24-1), triethylaluminum (TEA, CAS# 97-93-8) diethylaluminum chloride (DEAC, CAS# 96-10-6), and triisobutylaluminum, (TiBAl, CAS# 100-99-2).

In some instances, the amorphous hexene-1 containing polyolefins and/or non-hexene-1 containing amorphous polypropylenes are produced using an electron donating compound internally associated with the primary reaction catalyst.

In some instances, the amorphous hexene-1 containing polyolefins and/or non-hexene-1 containing amorphous polypropylenes are produced in the absence of an electron donating compound internally associated with the primary reaction catalyst.

In some, instances, the amorphous hexene-1 containing polyolefins and/or non-hexene-1 containing amorphous polypropylenes are produced by externally adding an electron donating compound to the reaction medium. In some instances, the amorphous hexene-1 polyolefins and/or non-hexene-1 containing amorphous polypropylenes are produced without addition of an electron donating compound external to the reaction medium.

In some instances, the electron donating compound is an alkoxysilane having the formula RnSi-(OR')-n where n=1-3, R=aryl or alkyl and R'=C1-3 alkyl. The electron donating compound is added in a sufficient quantity such that the molar ratio of the co-catalyst to alkoxysilane is in the range from about 10:1 to about 500:1 and may be from 10:1 to 100:1.

The inclusion of the alkoxysilane electron donating compound, such as for example cyclohexylmethyl dimethoxysilane, (CMDMS, CAS # 17865-32-6), phenyl triethoxysilane, (PES, CAS# 780469-8), diphenyl dimethoxysilane (DPDMS, CAS# 6843-66-9), diisopropyl dimethoxysilane (DIDMS, CAS# 18230-61-0) or dicyclopentyl dimethoxysilane (DCPDMS, CAS# 126990-35-0), imparts some unique characteristics to the physical and mechanical properties of the amorphous copolymer and terpolymer, not achievable without the presence of the donor in the reaction medium, properties that may favorably affect the final performance of the hot melt adhesive containing it.

Hot melt adhesive formulations according to the present disclosure can be used in various sectors of industry to permanently or temporarily join or adhere two or more similar or dissimilar materials to each other. In some instances, the hot melt adhesive formulations disclosed herein can be used to permanently or temporarily join or adhere a joint or space between two or more similar or dissimilar materials to form a seal there between. For example, hot melt adhesive formulations disclosed herein may be used to sealingly join segments of square or other shaped frames by applying an amount of a hot melt adhesive formulation between the joints of each frame segment. In some instances, the hot melt adhesive formulations disclosed herein can be applied to a back portion of a label, sticker, advertisement, reflector, and the like, and used to permanently or temporarily adhere the label to a structure. In some instances, the hot melt adhesive formulations disclosed herein can be applied to a side of a strip material made of, for example fibrous, plastic, metallic materials to form a sealing and/or reflective tape. The sealing tape can be fabricated as individual sealing tapes strips, rolls or sealing tape, or any other suitable configuration. In some instances, the hot melt adhesive formulations disclosed herein can be applied to portions of rubbers, woven or non-woven fabrics, woven or non-woven plastics, or other suitable materials to join two or more components for the fabrication of an article of clothing such as, for example, hats, shoes, shirts, pants, jackets, gloves, safety wear, wetsuits, and the like.

Yet in some other instances, the hot melt adhesive formulations disclosed herein can be applied to non-woven fabrics or to blends of nonwoven fabrics or to plastic polyethylene films or to blended polyethylene and polypropylene films or to combinations of the non-woven fabrics with the plastic films, or to other suitable materials to join two or more components for the fabrication of personal hygiene articles such as baby or infant diapers, or a child diaper or a feminine hygiene article or an adult incontinence article.

Although the present invention and its objects, features and advantages have been described in detail, other embodiments are encompassed by the invention. Finally, those skilled in the art should appreciate that they can readily use the disclosed conception and specific embodiments as a basis for designing or modifying other structures for carrying out the same purposes of the present invention without departing from the scope of the invention as defined by the appended claims.

The hexene-1 based copolymers and terpolyomers described herein, are characterized by the PSTC (Pressure Sensitive Tape Council) rolling ball tack (RBT) test method 6 and Holding Power (H/P), PSTC test method 107.

It should be noted that a primary use of the hot melt adhesive formulation is as a pressure sensitive adhesive (PSA).

Now turning to the Figures, FIG. 1 depicts a table of examples 1 through 14.

EXAMPLE 1

Copolymer Version

A hot melt adhesive formulation has 60 wt. % of an amorphous propylene-co-hexene-1 polymer component based on the total weight of the hot melt adhesive without the use of flammable solvents.

The amorphous propylene-co-hexene-1 polymer component has 50 wt. % of propylene co-monomer based on the total weight of the amorphous propylene-co-hexene-1 polymer component and 50 wt. % of a hexene-1 co-monomer based on the total weight of the amorphous propylene-co-hexene-1 polymer component and wherein the hexene-1 monomer to propylene monomer ratios are 1:1.

40 wt % of a co-adjuvant is added to the amorphous propylene-co-hexene-1 polymer component without the use of flammable solvents, such as partially or a fully hydrogenated $C_5$ and $C_5$-$C_9$, or a fully hydrogenated dicyclopentadiene (DCPD) tackifier based on the total weight of the hot melt adhesive composed of at least one of co-adjuvants, wherein the hot melt adhesive formulation has a rolling ball tack value of 25 centimeters at ambient temperature after conditioning at ambient temperatures for 24 hours, as per Pressure Sensitive Tape Council (PSTC) Test Method 6. An example of the named co-adjuvants is Eastotac H100W (CAS# 69430-35-9), a hydrogenated C5 tackifier from Eastman Chemical, Kingsport, Tenn.

EXAMPLE 2

Copolymer Version

A hot melt adhesive formulation has 90 wt. % of an amorphous propylene-co-hexene-1 polymer component based on the total weight of the hot melt adhesive without the use of flammable solvents.

The amorphous propylene-co-hexene-1 polymer component has 60 wt. % of propylene co-monomer based on the total weight of the amorphous propylene-co-hexene-1 polymer component; and 40 wt. % of a hexene-1 co-monomer based on the total weight of the amorphous propylene-co-hexene-1 polymer component and wherein the propylene monomer to hexene-1 monomer ratios are 3:2.

10 wt. % of a co-adjuvant is added to the amorphous propylene-co-hexene-1 polymer component, such as a plasticizer, like mineral oil or naphthenic oil, based on the total weight of the hot melt adhesive. The hot melt adhesive formulation has a rolling ball tack value of 10 centimeters at ambient temperature after conditioning at ambient temperatures for 24 hours. Examples of the named plasticizers are the white mineral oil Hydrobrite 1000 (CAS 4 8042-47-5) from Sonneborn Inc.

EXAMPLE 3

Copolymer Version

A hot melt adhesive formulation has 95 wt. % of an amorphous propylene-co-hexene-1 polymer component based on the total weight of the hot melt adhesive without the use of flammable solvents.

The amorphous propylene-co-hexene-1 polymer component having 70 wt. % of propylene co-monomer based on the total weight of the amorphous propylene-co-hexene-1 polymer component; and 30 wt. % of a hexene-1 co-monomer based on the total weight of the amorphous propylene-co-hexene-1 polymer component and wherein the propylene monomer to hexene-1 monomer ratios are 7:3.

5 wt. % of a co-adjuvant is added to the amorphous propylene-co-hexene-1 polymer component, such as the hydrogenated DCPD Escorez 5400 tackifier (Exxon Mobil Chemical Co., Spring, Tex.), based on the total weight of the hot melt adhesive composing at least one of co-adjuvants, wherein the hot melt adhesive formulation has a rolling ball tack value of 47 centimeters at ambient temperature after conditioning at ambient temperatures for 24 hours.

EXAMPLE 4

Copolymer Version

A hot melt adhesive formulation has 100 wt. % of an amorphous propylene-co-hexene-1 polymer component based on the total weight of the hot melt adhesive without the use of flammable solvents.

The amorphous propylene-co-hexene-1 polymer component consists of 50 wt. % of hexene-1 co-monomer based on the total weight of the amorphous propylene-co-hexene-1 hexene-1 polymer component; and 50 wt. % of a propylene co-monomer based on the total weight of the amorphous propylene-co-hexene-1 polymer component and wherein the hexene-1 monomer to propylene monomer ratios are 1:1. The hot melt adhesive formulation has a rolling ball tack value of 5 centimeters at ambient temperature after conditioning at ambient temperatures for 24 hours.

EXAMPLE 5

Copolymer Version

A hot melt adhesive formulation has 92 wt. % of an amorphous propylene-co-hexene-1 polymer component based on the total weight of the hot melt adhesive without the use of flammable solvents.

The amorphous propylene-co-hexene-1 polymer component consists of 20 wt. % of propylene co-monomer based on the total weight of the amorphous propylene-co-hexene-1 polymer component; and 80 wt % of a hexene-1 co-monomer based on the total weight of the amorphous propylene-co-hexene-1 polymer component and wherein the propylene monomer to hexene-1 monomer ratios are 1:4.

8 wt. % of a co-adjuvant is added to the amorphous propylene-co-hexene-1 polymer component, such as a silanated amorphous poly alpha olefin (SiAPAO) based on the total weight of the hot melt adhesive composing at least one of co-adjuvants, and the hot melt adhesive formulation has a rolling ball tack value of 13 centimeters at ambient temperature after conditioning at ambient temperatures for 24 hours.

EXAMPLE 6

Copolymer Version

A hot melt adhesive formulation has 70 wt % of an amorphous propylene-co-hexene-1 polymer component based on the total weight of the hot melt adhesive without the use of flammable solvents.

The amorphous propylene-co-hexene-1 polymer component consists of 50 wt. % of propylene co-monomer based on the total weight of the amorphous propylene-co-hexene-1 polymer component and 50 wt. % of a hexene-1 co-monomer based on the total weight of the amorphous propylene-co-hexene-1 polymer component and wherein the hexene-1 monomer to propylene monomer ratios are 1:1.

30 wt. % of a co-adjuvant is added to the amorphous propylene-co-hexene-1 polymer component, such as a functionalized amorphous butene-1-co-hexene-1 (ABH) copolymer or a functionalized terpolymer known as functionalized amorphous propylene-co-butene-1-co-hexene-1 (APBH), based on the total weight of the hot melt adhesive composing at least one of co-adjuvants, and the hot melt adhesive formulation has a rolling ball tack value of 2 centimeters at ambient temperature after conditioning at ambient temperatures for 24 hours.

EXAMPLE 7

Terpolymer Version

A hot melt adhesive terpolymer formulation has 90 wt. % of an amorphous propylene-co-hexene-1-co-butene-1 polymer component based on the total weight of the hot melt adhesive without the use of flammable solvents.

The amorphous propylene-co-butene-1-co-hexene-1 polymer component has (i) 30 wt. % of propylene co-monomer based on the total weight of the amorphous propylene-co-butene-1-co-hexene-1 polymer component (ii) 20 wt. % of a butene-1 co-monomer based on the total weight of the amorphous propylene-co-butene-1-co-hexene-1 polymer component, and (iii) 50 wt. % of a hexene-1 co-monomer based on the total weight of the amorphous propylene-co-butene-1-co-hexene-1 polymer component wherein the propylene monomer to butene-1 monomer to hexene-1 monomer is a ratio of 3:2:5.

10 wt % of a co-adjuvant is added to the amorphous propylene-co-butene-1-co-hexene-1 polymer component, such as the hydrogenated DCPD Escorez 5400 tackifier based on the total weight of the hot melt adhesive composing at least one of co-adjuvants, wherein the hot melt adhesive formulation has a rolling ball tack value of 10 centimeters at ambient temperature after conditioning at ambient temperature for 24 hours, and a holding power of 120 minutes at room temperature

EXAMPLE 8

Terpolymer Version

A hot melt adhesive formulation has 99 wt. % of an amorphous propylene-co-butene-1-co-hexene-1 polymer component based on the total weight of the hot melt adhesive without the use of flammable solvents.

The amorphous propylene-co-butene-1-co-hexene-1 polymer component has (i) 30 wt. % of propylene co-monomer based on the total weight of the amorphous propylene-co-butene-1-co-hexene-1 polymer component (ii) 40 wt. % of a butene-1 co-monomer based on the total weight of the amorphous propylene-co-butene-1-co-hexene-1 polymer component, and (iii) 30 wt. % of a hexene-1 co-monomer forming a terpolymer of the amorphous hexene-1 polymer component and wherein the propylene co-monomer to butene-1 co-monomer to hexene-1 co-monomer is a ratio of 3:4:3.

1 wt. % of a co-adjuvant is added to the amorphous propylene-co-butene-1-co-hexene-1 polymer component, such as a mineral oil, or naphthenic oil plasticizer, based on the total weight of the hot melt adhesive. The hot melt adhesive formulation has a rolling ball tack of 20 centimeters at ambient temperature after conditioning at ambient temperature for 24 hours without the use of flammable solvents, and a holding power of 50 minutes

EXAMPLE 9

Copolymer with Electron Donor

A hot melt adhesive formulation has 90 wt. % of an amorphous propylene-co-hexene-1 polymer component based on the total weight of the hot melt adhesive without the use of flammable solvents.

The amorphous propylene-co-hexene-1 polymer component contains 40 wt. % of propylene co-monomer based on the total weight of the amorphous propylene-co-hexene-1 polymer component; and 60 wt. % of a hexene-1 co-monomer based on the total weight of the amorphous propylene-co-hexene-1 polymer component and wherein the hexene-1 co-monomer to propylene co-monomer ratios are 3:2.

An electron donor consisting of an alkoxy silane component of the formula RnSi-(OR')4-n where n=1-3, R aryl or alkyl and R'=C1-3 alkyl is added externally, during the propylene and hexene-1 copolymerization reaction, in a sufficient quantity such that the molar ratio of a organo-aluminum co-catalyst added to the polymer reaction to the alkoxy silane is in the range of 500:1. The external donor in this example is phenyl triethoxy silane, PES.

10 wt. % of a co-adjuvant is added to the amorphous propylene-co-hexene-4 polymer component, such as maleated polyethylene, based on the total weight of the hot melt adhesive. The hot melt adhesive formulation has a rolling ball tack of 25 centimeters at ambient temperature after conditioning at ambient temperatures for 24 hours without the use of flammable solvents.

EXAMPLE 10

Terpolymer with Electron Donor

A hot melt adhesive terpolymer formulation has 60 wt. % of an amorphous propylene-co-butene-1-cohexene-1 polymer component based on the total weight of the hot melt adhesive without the use of flammable solvents.

The amorphous propylene-co-butene-1-co-hexene-1 polymer component has (i) 60 wt. % of propylene co-monomer based on the total weight of the amorphous propylene-co-butene-1-co-hexene-1 polymer component (ii) 20 wt. % of a butene-1 co-monomer based on the total weight of the amorphous propylene-co-butene-1-co-hexene-1 polymer component, and (iii) 20 wt. % of a hexene-1 co-monomer forming a terpolymer of the amorphous hexene-1 polymer component and wherein the propylene co-monomer to butene-1 co-monomer to hexene-1 co-monomer is a ratio of 3:1:1.

An electron donor consisting of an alkoxy silane component of the formula RnSi-(OR')4-n where n=1-3, R=aryl or alkyl and R'=C1-3 alkyl is added externally, during the polymerization reaction, in a sufficient quantity such that the molar ratio of an organo-aluminum co-catalyst to the alkoxy silane is in the range of 10:1. The external donor in this example is phenyl triethoxy silane (PES).

40 wt. % of a co-adjuvant is added to the amorphous propylene-co-butene-1-co-hexene-1 polymer component, such as a low molecular weight maleated polyethylene wax based on the total weight of the hot melt adhesive. The hot melt adhesive formulation has a rolling ball tack of 50 centimeters at ambient temperature after conditioning at ambient temperatures for 24 hours and a holding power of 1440 minutes.

EXAMPLE 11

Copolymer Version

A hot melt adhesive formulation has 80 wt % of an amorphous propylene-co-hexene-1 polymer component based on the total weight of the hot melt adhesive without the use of flammable solvents.

The amorphous propylene-co-hexene-1 polymer component consists of 60 wt. % of propylene co-monomer based on the total weight of the amorphous propylene-co-hexene-1 polymer component; and 40 wt % of a hexene-1 co-monomer based on the total weight of the amorphous propylene-co-hexene-1 polymer component and wherein the propylene co-monomer to hexene-1 co-monomer ratios are 3:2.

20 wt. % of a co-adjuvant is added to the amorphous propylene-co-hexene-1 polymer component, such as another amorphous poly alpha (APAO), [for example RT 2730 (CAS# 29160-1342), manufactured by REXtac, LLC] based on the total weight of the hot melt adhesive. The hot melt adhesive formulation has a rolling bail tack of 10 centimeters at ambient temperature after conditioning at ambient temperatures for 24 hours without the use of flammable solvents.

EXAMPLE 12

Copolymer Version

A hot melt adhesive formulation has 88 wt. % of an amorphous propylene-co-hexene-1 polymer component based on the total weight of the hot melt adhesive without the use of flammable solvents.

The amorphous propylene-co-hexene-1 polymer component consists of 40 wt. % of propylene co-monomer based on the total weight of the amorphous propylene-co-hexene-1 polymer component; and 60 wt. % of a hexene-1 co-monomer based on the total weight of the amorphous propylene-co-hexene-1 polymer component and wherein the propylene co-monomer to hexene co-monomer ratios are 2:3.

12 wt. % of a co-adjuvant is added to the amorphous propylene-co-hexene-1 polymer component, such as Kraton MD-1648, a styrene block co-polymer (from Kraton Corp., Houston Tex.), based on the total weight of the hot melt adhesive. The hot melt adhesive for has a rolling ball tack of 15 centimeters at ambient temperature after conditioning at ambient temperatures for 24 hours without the use of flammable solvents.

EXAMPLE 13

Terpolymer Version

A hot melt adhesive terpolymer formulation of 75 wt. % of an amorphous propylene-co-butene-1-co-hexene-1 polymer component based on the total weight of the hot melt adhesive without the use of flammable solvents.

The amorphous propylene-co-butene-1-co-hexene-1 polymer component has 20 wt % of propylene co-monomer based on the total weight of the amorphous propylene-co-butene-1-co-hexene-1 polymer component (ii) 40 wt. % of a butene-1 co-monomer based on the total weight of the amorphous propylene-co-butene-1-co-hexene-1 polymer component, and (iii) 40 wt. % of a hexene-1 co-monomer forming a terpolymer of the amorphous hexene-1 polymer component and wherein the propylene co-monomer to butene-1 co-monomer to hexene-1 co-monomer is a ratio of 1:2:2.

25 wt. % of a co-adjuvant is added to the amorphous propylene-co-butene-1-co-hexene-1 polymer component, such as Epolene 43 (Westlake Chemical Corp. 2.5 Houston, Tex.), a maleated polypropylene wax based on the total weight of the hot melt adhesive and the hot melt adhesive formulation has a rolling ball tack value of 40 centimeters at ambient temperature after conditioning at ambient temperatures for 24 hours and a holding power of 400 minutes.

EXAMPLE 14

Terpolymer Version

A hot melt adhesive formulation of 80 wt. % of an amorphous propylene-co-butene-1-co-hexene-1 polymer component based on the total weight of the hot melt adhesive without the use of flammable solvents.

The amorphous propylene-co-butene-1-co-hexene-1 polymer component has (i) 30 wt. % of propylene co-monomer based on the total weight of the amorphous propylene-co-butene-1-co-hexene-1 polymer component (ii) 60 wt. % of a butene-1 co-monomer based on the total weight of the amorphous propylene-co-butene-1-co-hexene-1 polymer component, and (iii) 10 wt. % of a hexene-1 co-monomer forming a terpolymer of the amorphous hexene-1 polymer component and wherein the hexene-1 co-monomer to propylene co-monomer to butene-1 co-monomer is a ratio of 1:6:3.

20 wt. % of a combination of co-adjuvants is added to the amorphous propylene-co-butene-1-co-hexene-1 polymer component, such as polyethylene waxes and polypropylene waxes, wherein the hot melt adhesive formulation has a rolling ball tack of 40 centimeters at ambient temperature after conditioning at ambient temperatures for 24 hours and a holding power of 600 minutes.

In embodiments, the hot melt adhesive formulation is used for the permanent or temporary joining of two or more similar or dissimilar materials.

In embodiments, the hot melt adhesive formulation is used for the permanent or temporary laminating of two or more similar or dissimilar materials.

In embodiments, the hot melt adhesive formulation is used for the permanent or temporary laminating of two or more similar or dissimilar films, films-to-metal, metal-to-metal.

Applications and Uses

1) An article such as a disposable infant diaper has a permanent connection of two similar structural materials, namely a non-woven and a polyolefin film with the hot melt adhesive described herein in Example 1 having a thickness of from 0.0005 to 0.005 inches.

2) An article, such as a feminine hygiene pad has a temporary connection of two dissimilar structural materials, namely a silicone release liner and a polyethylene film with the hot melt adhesive described herein in Example 2 having a thickness of from 0.0005 to 0.005 inches.

3) An article such as a bulletin hoard has permanent lamination of a first film, such as a woven fabric having a thickness of 0.01 to 0.05 inches to a second substrate, such as a cork board having a thickness of 0.3 to 0.7 inches with the hot melt adhesive described in Example 5 having a thickness of from 0.005 to 0.01 inches.

4) An article of clothing, such as a shoe insole has the rubber and foam components glued together with the hot melt adhesives described in Example 12 using a thickness of 0.005 to 0.1 inches.

While these embodiments have been described with emphasis on the embodiments, it should be understood that within the scope of the appended claims, the embodiments might be practiced other than as specifically described herein.

What is claimed is:

1. A hot melt adhesive formulation comprising:
    a. 60 wt. % to 99 wt. % of an amorphous propylene-co-hexene-1 polymer component based on the total weight of the hot melt adhesive produced without the use of flammable solvents and produced using a Ziegler-Natta catalyst, and an organo-aluminum co-catalyst in a reaction medium, and by using an electron donating compound in the reaction medium, further wherein the amorphous propylene-co-hexene-1 polymer component comprises: long chains of propylene and hexene-1 monomers assembled together in a random order which inhibits the formation of crystalline structures or crystalline order, the amorphous propylene-co-hexene-1 polymer component consisting of:
        (i) 20 wt. % to 80 wt. % of hexene-1 co-monomer based on the total weight of the amorphous propylene-co-hexene-1 polymer component;
        (ii) 20 wt. % to 80 wt. % of a propylene co-monomer based on the total weight of the amorphous propylene-co-hexene-1 polymer component; and wherein a hexene-1 co-monomer to propylene co-monomer ratio is from 4:1 to 1:4; and
    b. 1 wt. % to 40 wt. % of a co-adjuvant based on the total weight of the hot melt adhesive, wherein the hot melt adhesive formulation has a rolling ball tack from 2 to 50 centimeters at ambient temperature after conditioning at ambient temperatures for 24 hours without the use of flammable solvents, and wherein the co-adjuvant is selected from a member of the group consisting of: low molecular weight metallocene-made polyethylenes, low molecular weight metallocene-made polypropylenes, low molecular weight maleated polypropylene, low molecular weight maleated polyethylene, styrene block co-polymers, amorphous poly alpha olefins (APAO), functionalized hexene-1 based copolymers and terpolymers, forming a hot melt adhesive formulation with a rolling ball tack of from 2 to 50 centimeters at ambient temperature after conditioning at ambient temperature for 24 hours, and a holding power of at least 400 minutes.

2. The hot melt adhesive of claim 1, comprising 20 wt. % to 80 wt. % of a 1-butene co-monomer in the amorphous propylene-co-hexene-1 polymer component, forming a terpolymer of the amorphous hexene-1 polymer component, and wherein the hexene-1 co-monomer to the propylene co-monomer to the butene-1 co-monomer is at a ratio of 1:3:1 to 3:1:1 and the hot melt adhesive formulation has a rolling ball tack from 2 centimeter to 50 centimeters at ambient temperature after conditioning at ambient temperatures for 24 hours and the hot melt adhesive formulation has a holding power of from 5 minutes to 1440 minutes.

3. The adhesive formulation of claim 1, wherein the electron donating compound consists of an alkoxy silane component of the formula $RnSi-(OR')4-n$ where $n=1-3$, $R=$aryl or alkyl and $R'=C1-3$ alkyl in a sufficient quantity such that the molar ratio of organo-aluminum co-catalyst to alkoxy silane is in the range from 10:1 to 500:1.

4. The adhesive formulation of claim 2, wherein the electron donating compound consists of an alkoxy silane component of the formula $RnSi-(OR')4-n$ where $n=1-3$, $R=$aryl or alkyl and $R'=C1-3$ alkyl in a sufficient quantity such that the molar ratio of organo-aluminum co-catalyst to alkoxy silane is in the range from 10:1 to 500:1.

5. The hot melt adhesive formulation of claim 1, wherein the co-adjuvants are selected from the group consisting of polyethylene waxes, polypropylene waxes, low molecular weight maleated polyethylene wax, maleated polypropylene waxes.

6. An article comprising a permanent or temporary connection of two similar structural materials with the formulation of claim 1.

7. An article comprising a permanent or temporary connection of two dissimilar structural materials with the formulation of claim 1.

8. An article comprising a permanent or temporary connection of a film to a metal substrate with the formulation of claim 1.

9. An article comprising a permanent lamination of two similar films with the formulation of claim 1.

10. An article comprising a temporary lamination of two dissimilar films with the formulation of claim 1.

11. An article of clothing constructed with the formulation of claim 1.

12. An article of personal hygiene such as an infant or child care diaper or an adult incontinence diaper or a feminine hygiene article constructed with the formulation of claim 1.

13. A label constructed with the formulation of claim 1.

14. A sealing tape formed using the formulation of claim 1.

* * * * *